J. D. DIFFENBAUGH.
WAGON SIGN.
APPLICATION FILED JULY 15, 1916.
1,238,749.
Patented Sept. 4, 1917.
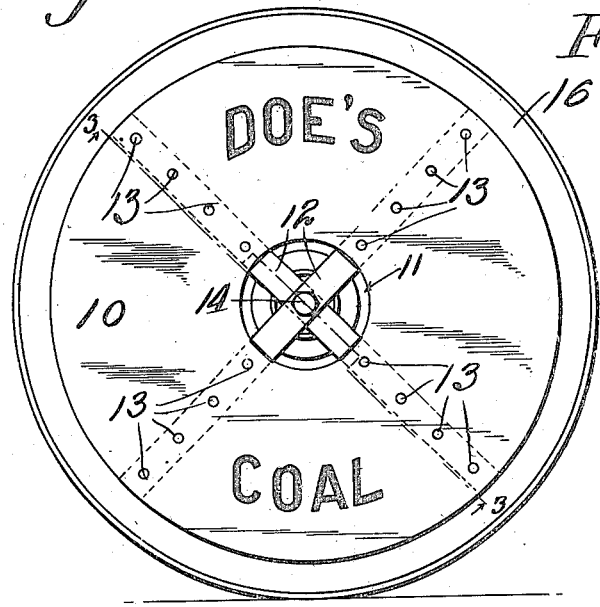
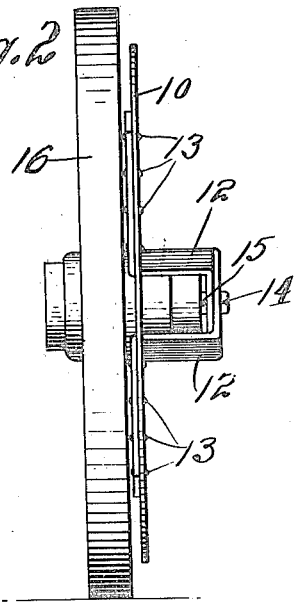
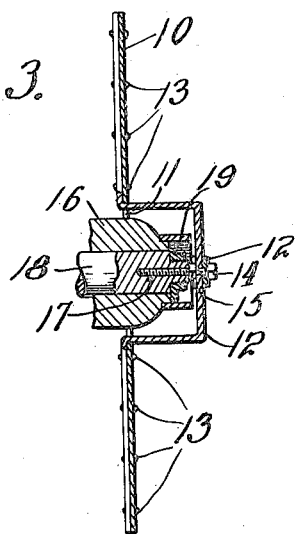
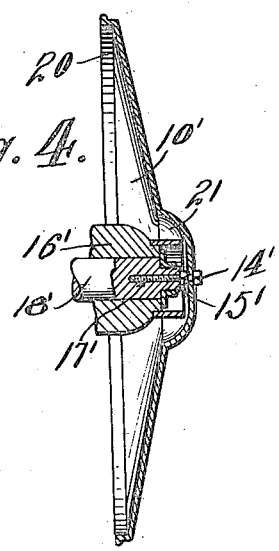
WITNESSES
R. J. Williams.
Ross J. Woodward.
INVENTOR
John D. Diffenbaugh
BY Richard Owen.
ATTORNEY

UNITED STATES PATENT OFFICE.

JOHN D. DIFFENBAUGH, OF MONMOUTH, ILLINOIS.

WAGON-SIGN.

1,238,749.

Specification of Letters Patent.  Patented Sept. 4, 1917.

Application filed July 15, 1916.  Serial No. 109,560.

*To all whom it may concern:*

Be it known that I, JOHN D. DIFFENBAUGH, a citizen of the United States, residing at Monmouth, in the county of Warren and State of Illinois, have invented certain new and useful Improvements in Wagon-Signs, of which the following is a specification.

This invention relates to an improved sign and the principal object of the invention is to provide a sign so constructed that it may be connected with a wagon axle and cover the spokes of the supporting wheel thus giving the wheel the appearance of a solid wheel and at the same time providing a sign which will be rigidly connected with the axle and thus held against rotation as the wheel turns.

Another object of the invention is to so construct this sign that it may be very easily and readily put in place or removed and to further so construct it that it may be connected with wagons already in use, it being simply necessary to provide a threaded socket in the axle in order to mount the sign.

Another object of the invention is to so construct this sign that it will not interfere with the easy rotation of the wheel and to further so construct it that it may serve as a hub protector thus preventing the wheel from gathering dirt, sand or other material which might drop upon the hub from a wagon.

This invention is illustrated in the accompanying drawings, wherein:—

Figure 1 is a view showing a wheel with the improved sign positioned in operative relation to the same, the wheel and sign being shown in side elevation.

Fig. 2 is a view in elevation of the wheel and sign taken at right angles to the view in Fig. 1.

Fig. 3 is a sectional view taken along the line 3—3 of Fig. 1.

Fig. 4 is a view similar to Fig. 3 showing a modified form of sign.

The sign 10 in Figs. 1, 2, and 3 is in the form of a disk having an enlarged central opening 11 through which extend the carrying yokes 12, the arms of the yokes being bent to extend along the inner face of the disk and secured thereto by means of rivets 13. These yokes extend in crossed relation as shown in Fig. 1 and are provided with registering openings through which extends the bolt 14, a locking nut 15 being screwed upon the bolt as shown in Figs. 2 and 3 to securely hold the yokes in engagement with each other.

This sign is put in place with the hub of the wagon wheel 16 extending through the opening in the disk and when the bolt is screwed into the threaded socket 17 formed in the axle or spindle 18, the sign will be securely connected with the axle and will completely hide the spokes of the wheel. This sign will not engage the hub, spokes or felly of the wheel and therefore it will not interfere with the free rotation of the wheel upon the axle. If it is necessary to remove the wheel in order to apply grease to the axle, the sign can be removed by turning the bolt 14 in the proper direction and the securing nut 19 of the wheel can then be removed and the wheel withdrawn from the axle.

In Fig. 4 there has been shown a modified form of sign in which the sign 10' is in the form of a disk, concaved and having its edge portion provided with a flange 20 extending to a point adjacent the felly of the wheel and having its central portion extending outwardly to provide a hood 21. The securing bolt 14' passes through an opening in the center of this hood 21 and is screwed into a socket 17' formed in the axle 18' of the wheel 16', a locking nut 15' being screwed upon this bolt 14' and engaging the inner face of the hood. It will thus be seen that the sign is of a construction somewhat similar to the one shown in Figs. 1, 2 and 3, the only difference being that in this form, the sign is provided with a hood 21 instead of with the yokes 12 and is provided with a flange 20 which is not used in the form shown in the previous figures.

What is claimed is:—

The combination with an axle having an integral spindle provided with a threaded opening leading from its outer end of a supporting wheel rotatably mounted upon said axle, a securing nut for the wheel upon the outer end of the spindle, a sign positioned in front of the spoke portion of the wheel, a securing bolt for the sign screwed into the threaded opening of the axle and having a head at its outer end engaging the sign, and a clamping nut upon the securing bolt for clamping the sign between the clamping nut and the head of the bolt and holding the sign in spaced relation to the wheel and holding the sign against movement.

In testimony whereof I affix my signature in presence of two witnesses.

JOHN D. DIFFENBAUGH.

Witnesses:
F. W. SWYGARD,
EDWIN E. LEADER.